Patented Nov. 19, 1929

1,736,757

UNITED STATES PATENT OFFICE

AUGUST AMANN, OF WIESBADEN, GERMANY, ASSIGNOR TO CHEMISCHE FABRIKEN DR. KURT ALBERT, G. M. B. H., OF BIEBRICH-ON-THE-RHINE-AMOENEBURG, GERMANY, A CORPORATION OF GERMANY

REACTION PRODUCTS OF A NATURAL RESIN-PHENOLIC RESINOUS MATERIAL AND METHOD OF MAKING SAME

No Drawing. Application filed October 20, 1926. Serial No. 143,016.

Many attempts have been made to produce resins adapted for the manufacture of varnishes and the like, by combining natural resins such as colophony with artificial resins such as the condensation products made from phenol and formaldehyde.

When two such resins are heated together it has been found that if one is to produce a final product which will give a sufficiently hard film to meet commercial requirements and which will have a sufficiently high melting point for the purposes outlined, it is necessary to utilize such a large proportion of the artificial resin that the process is properly described as one in which the natural resin is used as a softening agent for the artificial resin. When such a process is carried out it is found that the color of the final product is too dark for ordinary use, the material is not readily soluble and its cost is high.

I have found that I can produce resins of great value by reacting on natural resins (which may be those recently obtained such as colophony, or fossil resins such as copal) with a condensation product which is still reactive, that is, one which is capable of undergoing further condensation to form a hard resin. Such a reactive condensation product or resin-forming body may be a phenol alcohol (which may if desired be more or less dehydrated) or other reaction product of a phenolic body and a substance containing at least one carbonyl group, which reaction product may be resinous or may be oily, but which contains hydroxymethyl ($-CH_2OH$) groups capable of undergoing further condensation with the splitting off of water and the formation of a hard resin. For purposes of convenience, I term such a product broadly, a phenolic condensation product containing a reactive hydroxymethyl group. By reacting on a natural resin with such a condensation product (which is preferably used in the proportion of less than 1 part of such condensation product to 4 parts of natural resin) a final product is obtained which has good solubility in drying oils, petroleum distillates and similar thinners, and one which has a good color and gives a hard film.

*Example 1.*—100 parts of colophony are first heated with 10 parts of p-cresoldialcohol for 10 hours at 80° to 90° C. and then at a gradually rising temperature, up to 150° C. During this time the melting point of the mixture rises slowly from 60°—70° to 110—120° C. The product is soluble in benzine, benzol, turpentine, drying oils and mixtures thereof.

*Example 2.*—A reactive resin forming body of oily consistency is first prepared by the condensation of phenol, acetone and formaldehyde, e. g., the oily product obtained by reacting on dihydroxy-diphenyl-dimethylmethane with formaldehyde in alkaline medium. 10 parts of this product is heated with 100 parts of colophony for 8 hours at 90°—100° C. and then at a gradually increasing temperature up to 150° C. During this time the melting point of the mixture rises to 100°—110° C. and the resultant product has good solubility in drying oils, turpentine, benzine and other solvents used in varnish making. In this case the final product is of a very light color and does not darken under the influence of light.

The products thus obtained may be used for making varnishes or the like but I prefer either to neutralize them or esterify them, as for example in the manner described in Amann and Fonrobert application, Serial No. 690,650, filed February 4, 1924.

What I claim is:

1. The method of producing readily soluble resin compounds of value for use in making varnishes or the like which comprises heating a major portion of a natural resin with a substantially smaller portion of a phenolic condensation product containing a reactive hydroxy-methyl group at temperatures not exceeding 150° C. until the reaction is complete and a readily soluble homogeneous product results.

2. A process as defined in claim 1, in which the ratio of the natural resin to the phenolic body is not less than 4 to 1.

3. A process as defined in claim 1, in which the ratio of the natural resin to the phenolic body is about 10:1.

4. A process as defined in claim 1, in which the phenolic condensation product is a reaction product of dihydroxy-diphenyl-dimethylmethane and formaldehyde.

5. As a new product, a readily soluble resinous body adapted for use in making varnishes or the like, consisting of the reaction product of a major proportion of a natural resin and a minor proportion of a phenolic condensation product containing a reactive hydroxymethyl group.

AUGUST AMANN.